July 9, 1957 R. M. GOLD ET AL 2,798,461
FLUID POWER STEERING CONTROL VALVE
Filed June 10, 1953 3 Sheets-Sheet 1

INVENTORS
Robert M. Gold,
Henry S. Smith &
BY Clovis W. Lincoln
C. H. Sibbe
ATTORNEY July 9, 1957

R. M. GOLD ET AL 2,798,461

FLUID POWER STEERING CONTROL VALVE

Filed June 10, 1953

INVENTORS
Robert M. Gold,
Henry S. Smith &
BY Clovis W. Lincoln
C. H. Oilbe
ATTORNEY ent States Patent Office 2,798,461
Patented July 9, 1957

2,798,461

FLUID POWER STEERING CONTROL VALVE

Robert M. Gold, Clovis W. Lincoln, and Henry S. Smith, Saginaw, Mich., assignors to General Motors Corporation, Detroit, Mich., a corporation of Delaware Application June 10, 1953, Serial No. 360,636

2 Claims. (Cl. 121—46.5)

This invention relates to fluid power steering, especially of automotive vehicles, and more specifically concerns a fluid power steering gear particularly adapted for application to trucks and other heavy vehicles.

There are two general types of fluid power steering gears presently in use, namely the "integral" type as represented, for example, by the gear described in Davis Patent 2,213,271, wherein the valve controlling the fluid flow is associated with and actuated by movement of the steering shaft and the power is applied to the pitman arm; and the so-called "booster" type gears, which differ in that the valve is otherwise positioned and actuated, and in that the power is applied to a steering linkage member beyond the pitman or drop arm.

Although the booster gears offer pronounced advantages from the standpoint of cost and ease of installation, those thus far proposed for use on trucks and the like have been found lacking in one or more important respects. In general, these gears are subject to objection on the ground that they represent a sacrifice of sensitivity and responsiveness in the interest of ruggedness and durability. This deficiency is perhaps not of too great significance as to off-the-road vehicles, for instance, but is of serious concern with relation to delivery vehicles and the like, which must be maneuvered in heavy traffic and crowded quarters.

The present invention aims to provide a booster gear suited for application to trucks, which meets all of the above indicated requirements. A further object is to provide a booster easily incorporated in existing steering systems without expensive design changes. Still another object is to provide a booster gear showing excellent reversibility, with no tendency toward over-steering, and which gives the driver a road "feel" at all times. Still another object is to provide a gear of the indicated type adapted to dampen out road shocks, normally transmitted to the steering wheel. Still another object is to provide a booster gear in the operation of which the return of the dirigible wheels, induced by the geometry of the steering linkage, is not marked by an "overshooting" of the normal straight ahead position of these wheels.

Other objects and features of the invention will appear from the following specific description which will proceed with reference to the accompanying drawings in which.

Figure 1:
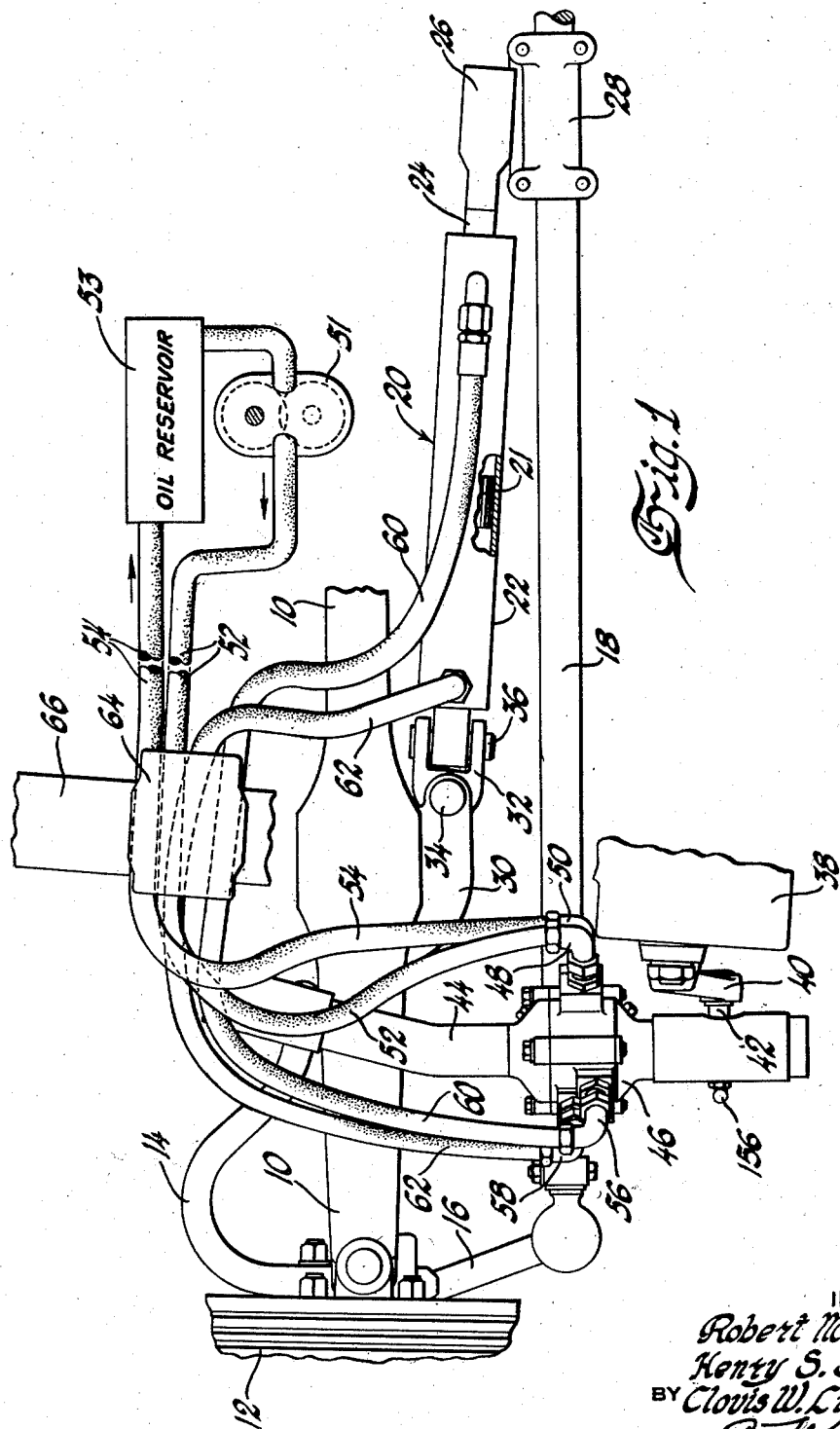
Figure 1 is a fragmentary plan view of a steering system incorporating the invention, certain auxiliary parts being shown diagrammatically.

Referring first to Figure 1, the numeral 10 denotes the front axle of a motor vehicle, a five-ton truck, for example. Operatively connected to the dirigible wheel 12 in the conventional manner is a pair of steering arms 14, 16, the latter being linked to a tie rod 18 connected at its opposite end to the counterpart of the arm 16. There is no counterpart of the steering arm 14.

The axle 10 and the tie rod 18 are interconnected through the fluid motor 20. This motor includes a piston 21, confined within the cylinder 22, having fixed thereto or integral therewith a shaft 24 anchored to the tie rod through an adapter 26 and a special fitting 28. The cylinder 22 is attached to the axle 10 by means of a universal connection comprising yokes 30 and 32 and pins 34 and 36, yoke 30 being fixed to the axle.

Positioned above the members so far described is a gear casing 38 having a pitman 40 depending therefrom. Housed within the casing 38 is the worm end of a conventional steering shaft, not shown, the worm mating with a gear sector, not shown, forming part of the pitman. A conventional ball nut may be interposed, with advantage, between the worm and sector.

Pitman 40 which will be seen as terminating in a ball stud 42 extending at right angles to the pitman arm is interconnected with the previously mentioned steering arm 14 via a drag link 44 carrying as a part thereof a control valve 46 for the fluid motor 20. This valve is provided with a pair of hose fittings 48 and 50 for hoses 52 and 54, which extend, respectively, to a pump 51, powered as from the crankshaft of the engine of the vehicle, and to an oil reservoir 53 from which the pump draws, hose 52 thus representing the inlet line to the valve, hose 54 the outlet or return line. As indicated, hydraulic operation of the subject booster is preferred, but the same may be adapted for air or vacuum operation, for example.

In addition to the fittings 48 and 50, the valve 46 carries fittings 56 and 58 corresponding to hose sections 60 and 62 respectively. Hose 60 extends to the right hand end of the cylinder 22, hose 62 to the left hand end thereof. All of these hose sections extend through a manifold support 64 suitably secured to the frame of the vehicle 66.

The housing of the valve is comprised of three members (Figure 2) 68, 70, and 72, member 68 having a threaded connection with the drag link 44. Within the housing member 70, is a spool 74 having a central land 76, end lands 78 and 80, and channels 75 and 77 resulting from the grooving incident to the formation of the lands. An annular groove 82 in the housing member 70 surrounds the central land 76 and connects via a passageway 85 (Figure 3) with the inlet line 52 from the source of fluid pressure; i. e. the pump 51. Similarly, end lands 78 and 80 are surrounded by annular grooves 84 and 86, these grooves also being formed in the housing member 70, and connecting with passageways 88 and 90, respectively, extending to the return line 54. Another pair of passageways 79, 81 in the valve housing 70 (Figure 3) terminate within the valve at points represented by the channels 77 and 75, respectively. Passageway 79 opens to the line 60 extending to the right hand end of the cylinder 22, passageway 81 to the line 62 attached to the cylinder at the left hand end thereof.

Valve 46 is an "open center" valve, the pressure fluid, with the spool centered, as shown, being free to circulate through the valve and motor thence back to the reservoir 53. Pump 51 is in constant operation so long as the engine of the vehicle is running.

A check valve 92 within the valve body comprises a ball 94 normally maintained in the position shown by the pressure of the inlet fluid. The purpose of this valve will later appear.

Disposed within bores in the housing member 70, and surrounding the spool 74, are a plurality of spring-loaded plunger sets (Figure 3), each comprising a pair of plungers 96 spaced apart by a compression spring 98 and extending slightly beyond the surfaces 97 of the housing 70, these surfaces being provided by the counterboring of the housing. The plunger sets exert an outward force against thrust washers 100, 102 at either end of the spool 74 and against the shoulders 104, 106 provided by the housing members 72 and 68, respectively. The thrust washers are held tight against the spool by a nut 108 at the end of the stem portion 110 of a plunger 112 through which the spool is actuated. Each washer has a single groove therein to provide restricted passageways 114, the chambers 116, 118 at either end of the spool thus being open to each other through the bore 120 of the spool. A body of fluid (indicated by the dot and dash lines) confined by these chambers and the spool together with the restricted passageways performs a damping function as will be later explained. It is important to observe that this fluid is entirely separate and apart from the fluid entering the valve via the line 52 (Figure 1). Threaded plugs 122, seen in Figure 2, close the ports through which the damping fluid is introduced into the valve either as an incident of its assembly or subsequently.

Valve-actuating plunger 112 is confined by the housing 72 and is reciprocal within such housing to the extent represented by the spaces between the inner surfaces of the thrust washers 100, 102 and the surfaces 97 of the housing 70. The plunger is bored and counterbored to house the ball 124 at the end of the ball stud 42 and associated parts. This stud, it will be remembered, is fixed to or integral with the depending arm of the pitman 40. Ball 124 seats between bearing blocks 126, 128, the former being held in place by a threaded plug 130 made secure by a cotter pin 132 extending through a hole in the plug and through aligned apertures in the plunger. Plug 130 is slightly spaced from a closure plug 134 received in the free end of the housing 72 and made secure by means of a cotter pin 136, which passes through aligned apertures in the housing 72. Plug 134 offers a safety stop which operates only if some part of the reciprocating mechanism fails.

Figure 2:
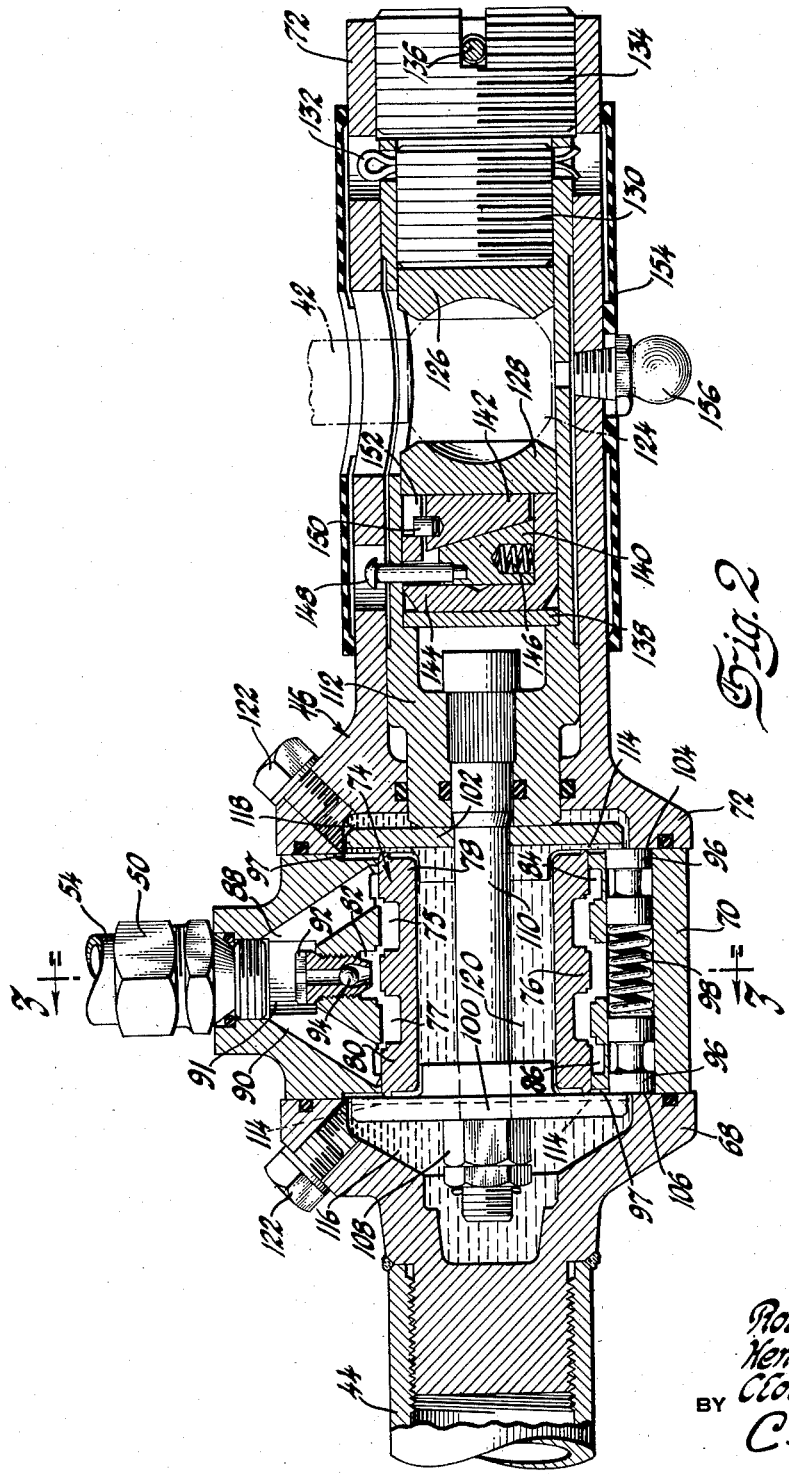
Figure 2 is a longitudinal section through the valve component of the power steering apparatus.
Figure 3:
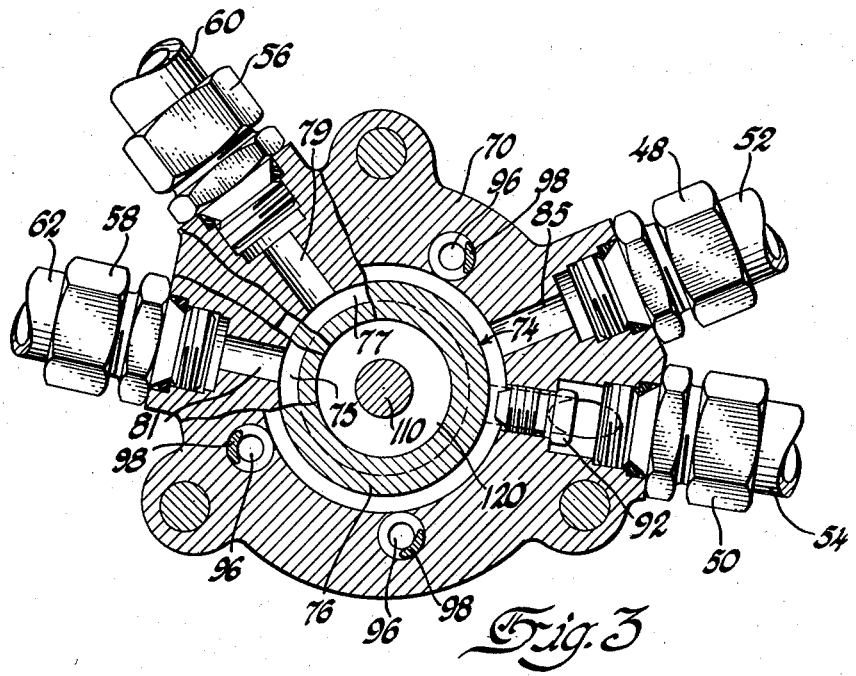
Figure 3 is a section taken generally on the line 3—3 of Figure 2.

To the left of the bearing block 128 and confined between such block and a washer 138 is a pair of wedge members 140, 142 and a cup shaped element 144 in which the wedge members seat. Wedge member 140 houses a compression spring 146 which exerts a force serving to maintain the bearing block 128 in proper engagement with the ball 124, this force being transmitted through the wedge member 142. Pins 148 and 150 maintain the wedge members in proper relation by preventing any turning or rotary movement of these members. The head of the pin 150 is disposed between the side walls of a slot formed in the seat 144, one of these walls 152 appearing in the drawings (Figure 2).

A protective boot 154 surrounds the elongated portion of the housing 72, this boot being apertured like the housing to receive the ball stud and a lubrication fitting 156.

It should be apparent that the plunger 112 and its associated stem 110 are in effect part and parcel of a unit including the spool 74 and the thrust washers 100, 102 and that any movement of the plunger necessarily induces like movement of the spool. This unit is normally maintained in the position shown, with the valve in a centered or neutral relation, by the spring-loaded plunger pairs 96, which obviously resist any axial displacement of the spool.

It is to be observed that the spaces between the plungers 96 within which the compression springs 98 are confined open to the annular groove 82 in the housing 70, which groove itself is open at all times to the inlet line 52 from the pump or other source of fluid pressure. With this arrangement, the pressure of the inlet fluid serves to supplement the centering action of the springs.

The total centering force provided by the plunger sets aided, as just indicated, by the pressure of the inlet fluid against the inner walls of the plungers is arbitrarily determined by the pre-loading of the compression springs. Ordinarily this centering force represents from two to eight pounds of manual effort at the rim of the steering wheel. Thus assuming a three-pound pre-loading, there is no displacement of the valve spool and hence no power steering when the resistance to steering is less than the equivalent of three pounds of effort at the steering wheel. With this condition prevailing, the vehicle is simply steered manually in the conventional way, the apparatus shown in Figure 2 simply performing as part of the drag link. When there is sufficient steering resistance, actuation of the pitman arm brings about movement of the spool relative to the housing, which tends to remain stationary, and admission of fluid at one side or the other of the piston in the fluid motor, as determined by the direction the steering wheel is rotated, with powering of the steering linkage.

Depending on the magnitude of the steering resistance, the fluid flow may be entirely confined to one end of the fluid motor, in which event a pressure of upwards of 700 P. S. I. may be developed. To prevent damage which might otherwise occur as a consequence of the building up of such a pressure, it is advisable to employ a suitable relief valve in the system. This is a well known and conventional expedient, hence illustration of such a valve in the drawings is not deemed necessary.

On movement of the spool 74 in either direction it should be evident that a portion of the fluid in the chamber 116, 118 toward which the movement occurs must pass from such chamber through the corresponding restricted passageway 114 into the bore 120 of the valve spool and that fluid confined in such bore must pass to the opposite chamber through the restricted passageway 114 corresponding to the opposite chamber. This damping or dash pot action precludes the possibility of the spool "over shooting" its neutral position when returning from one extreme, with consequent undesired energization of the motor in the opposite direction.

The present invention, of course, is not limited to the particular type of valve represented in Figure 2. Thus in lieu thereof there may be used a valve such as illustrated in an essentially diagrammatic fashion by Figure 4. In this construction the valve spool 160 is confined within a housing 162 having ports 164, 166, 168, and 170. Port 166 receives the inlet fluid from the source of fluid pressure and communicates with an arcuate groove 172 opening at both of its ends to a pair of arcuate grooves 174 delineated by a central ridge 176 which provides a seat for the central land 178 of the valve spool. The end lands 180, 182 of the spool are formed to a larger diameter than the central land for centering purposes. Thus, when the spool is displaced leftward such movement is resisted by the annular inner wall of the land 180, the extent of this resistance being a function of the difference between the diameter of the land and that of the central land. Similarly on rightward displacement of the spool its movement is resisted by the pressure of fluid against the inner annular wall of the land 182.

The end lands are functional with respect to the annular grooves 184 and 186, which, through passageways 188 and 190 connect with the port 170, corresponding to the return line to the source of fluid pressure. Ports 164 and 168 correspond to lines 60 and 62 (Figure 1) extending to the right end and left end, respectively, of the fluid motor.

Actuation of the valve spool 160 is accomplished through a plunger 192 having an elongated stem portion 194, which is grooved at 196 to provide a restricted passageway connecting restricted passageways 198 in sleeve members 200. These sleeves abut the spool at either end thereof and further abut at 202 and 204, respectively, the inner end of the body portion of the plunger 192 and a nut 206 threaded on the end of the stem portion 194 of the plunger. With this arrangement, it should be clearly evident that any movement of the plunger necessarily induces a like movement on the part of the spool. Plunger 192 may be considered as interconnecting with the pitman arm in the manner of plunger 112 (Figure 2).

Instead of spring-loaded plunger sets, the modified valve construction employs pre-loaded coil springs 158 positioned at either end of the spool between thrust washers 208 and 210. Axial movement of the spool in either direction against the spring resistance is limited by the shoulders 212 provided by the housing members confining the springs and associated parts.

The ports plugged by the closures 214 projecting from the top of the valves are for the purpose of bleeding air from the valve during charging of the valve, as indicated below, with the damping fluid represented by the dot and dash lines. This fluid fills the chambers in which the springs 158 are confined and the relatively smaller chambers delineated by the nut 26 and the left-hand washer 210 on the one hand and plunger 192 and the right-hand washer 210 on the other hand. The larger chambers in turn intercommunicate via the previously-mentioned restricted passageways 198 and through the groove 196 in the stem 194.

As in the case of the valve construction first described, it should be clear that any movement of the valve spool 160 is accompanied by displacement of fluid from the chamber at the end of the spool corresponding to the direction of movement of the spool. Thus on leftward movement of the spool, fluid flows from the chamber housing the left-hand spring 158, through the corresponding orifice 216, into the chamber delineated in part by the nut 206; while on rightward movement of the spool the flow is through the right-hand orifice 216 toward the plunger 192. Here again, of course, the object is to preclude "over shooting" of the spool as it returns toward its neutral position.

Figure 4:
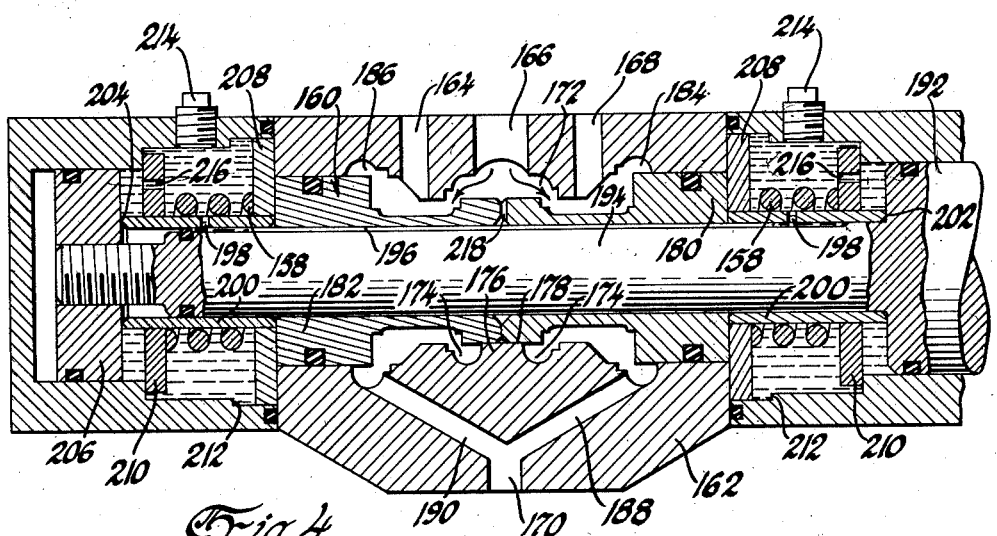
Figure 4 is a longitudinal section showing a modified form of valve.

Apart from the structural difference already described, the modified valve of Figure 4 differs from the valve previously discussed in that the damping system including the chambers at either end of the valve spool are interconnected with the main fluid system by a passageway 218 in the central land 178. The principal advantage of this arrangement goes to the fact that a special filling operation is avoided, the damping fluid being derived from the main system incident to the initial loading of the system. The pressure of the inlet fluid is at all times sufficient to prevent leakage of the damping fluid through the passageway 218.

To describe now the operation of the gear, applied as shown in Figure 1, let it be assumed that the operator of the vehicle wishes to negotiate a right turn and that the steering resistance is greater than the total centering force, as previously explained. On the clockwise rotation of the steering shaft, the valve spool (Figure 2) will necessarily be pulled to the right, so that the flow of the inlet fluid is partially or completely confined (depending upon the magnitude of steering resistance) to the left side of the valve. The right hand movement of the spool brings about partial or complete confinement of the fluid flow to the left side of the valve (Figure 2) and the partial or complete closing of the passageway 90 by the land 80, hence the bulk of the flow is directed to the line 60, which is supplied through the channel 77. Piston 21 in the cylinder 22, and with it the piston shaft 24, is accordingly caused to move to the left to carry the tie rod 18 in that direction and the dirigible wheels are turned to the right.

When the operator rotates the steering shaft counterclockwise in order to negotiate a left turn, the action obviously will be the opposite of that just described, the piston in this instance being caused to move to the right by the partial or complete confinement of the flow of the pressure fluid to the right side of the valve.

In the event of a pump failure, necessitating manual steering of the vehicle through the valve and its associated parts, the ball 94 of the check valve 92, which is normally held in the position shown by the pressure of the inlet fluid, as previously noted, drops down to interconnect the valve inlet and outlet lines, thus making it unnecessary for the operator to rotate the moving element of the pump as an incident of the manual steering.

The valve housing, of course, constitutes the follow-up member of the booster unit, the same moving in a direction corresponding to the direction of movement of the valve spool and tending at all times to catch up with the spool, so to speak, thereby to bring the two parts in a centered relation so as to de-energize the fluid motor.

We claim:

1. A power steering control valve comprising a pair of telescopically arranged members, the inner of which is movable relative to the outer on manipulation of a steering element with which the valve is adapted to be associated, said outer member having therein an inlet port, a power port, an exhaust port and a plurality of chambers connected to said inlet port and confining pairs of spring-spaced plungers operativley associated with said members so as to yieldingly resist movement of said inner member induced by the manipulation of said steering element, the action of said spring-spaced plungers being supplemented by pressure fluid admitted to said chambers, said valve being further characterized in the provision therein of a pair of washers, one at either end of said inner member, each having a restricted passageway formed therein, said washers being connected to said inner member to move therewith, and a body of fluid within the valve tending to resist movement of said washers induced by shock forces to which the valve is subject in use, such movement of said washers being marked by flow of fluid through said restricted passageways.

2. A power steering control valve comprising a pair of telescopically arranged members, the inner of which is movable relative to the outer on manipulation of a steering element with which the valve is adapted to be associated, and additionally comprising an inlet port, a power port and exhaust port formed in said outer member and a chamber connected to said inlet port adapted to confine a pair of spring-spaced plungers bearing against portions of said members so as to yieldingly resist movement of said inner member induced by the manipulation of said steering element, said valve being further characterized in the provision therein of a pair of washers, one at either end of said inner member, each having a restricted passageway formed therein, said washers being connected to said inner member to move therewith, and a body of fluid within the valve tending to resist movement of said washers induced by shock forces to which the valve is subject in use, such movement of said washers being marked by flow of fluid through said restricted passageways.

References Cited in the file of this patent

UNITED STATES PATENTS

| Number | Name | Date |
|---|---|---|
| 1,875,226 | Dewandre | Aug. 30, 1932 |
| 2,366,382 | Burton | Jan. 2, 1945 |
| 2,410,404 | Buchanan | Nov. 5, 1946 |
| 2,533,226 | Davis et al. | Dec. 12, 1950 |
| 2,596,242 | Hill | May 13, 1952 |
| 2,608,263 | Garrison | Aug. 26, 1952 |
| 2,679,235 | Meter | May 25, 1954 |
| 2,706,467 | Houldsworth | Apr. 19, 1955 |

FOREIGN PATENTS

| 586,206 | Great Britain | Mar. 11, 1947 |